Figure 1:
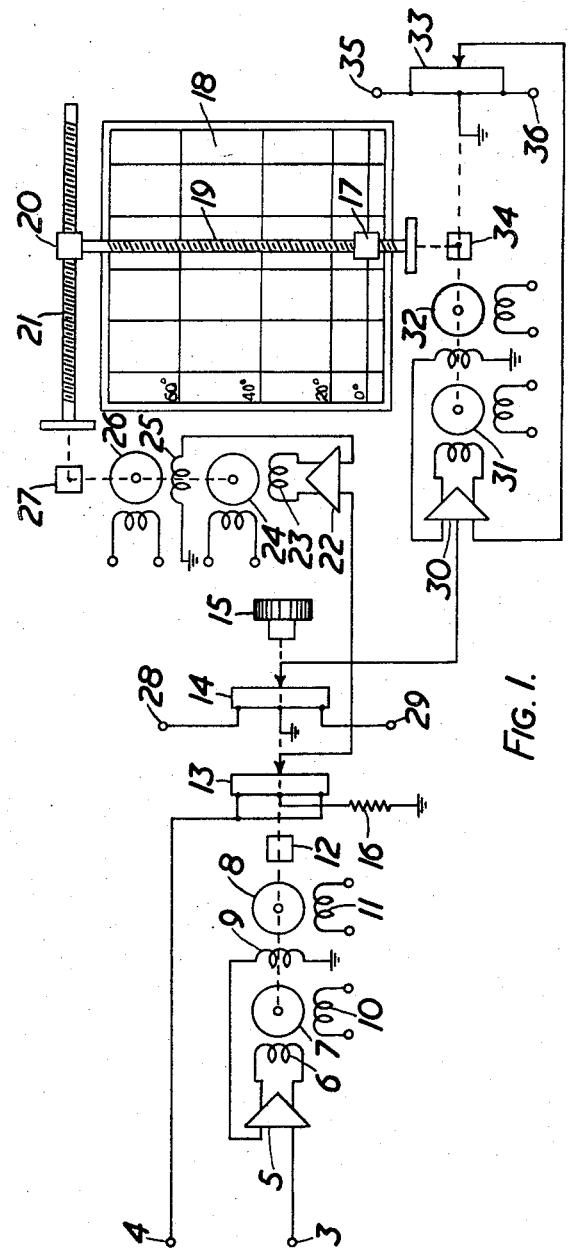

Sept. 30, 1958 A. E. CUTLER 2,853,800
NAVIGATIONAL TRAINING OR INSTRUCTION APPARATUS
Filed Sept. 1, 1954 2 Sheets-Sheet 1

INVENTOR
Albert Ernest Cutler
BY George H. Corey
ATTORNEY

Sept. 30, 1958  A. E. CUTLER  2,853,800
NAVIGATIONAL TRAINING OR INSTRUCTION APPARATUS
Filed Sept. 1, 1954  2 Sheets-Sheet 2

INVENTOR
Albert Ernest Cutler
BY
ATTORNEY

United States Patent Office 2,853,800
Patented Sept. 30, 1958

2,853,800

NAVIGATIONAL TRAINING OR INSTRUCTION APPARATUS

Albert Ernest Cutler, Crawley, England, assignor to Communications Patents Limited Application September 1, 1954, Serial No. 453,507

8 Claims. (Cl. 35—10.2)

This invention is concerned with apparatus, for instruction or training in navigation, of the kind incorporating means for indicating or recording the course of a craft or of a simulation craft which is being controlled by a pupil or pupils.

The invention is particularly applicable to that type of navigational training or instruction apparatus which pertains to aerial navigation and involves means for indicating or recording the ground path "flown" by a simulation aircraft.

An object of the present invention is to enable automatic course-indicating or course-recording apparatus to be used with charts based on the Mercator (cylindrical orthomorphic) projection. In the use of a Mercator chart, difficulties arise owing to the variation of the scale from point to point on the chart for, although the scale at any point is the same in all directions, it varies in proportion to the secant of the latitude and therefore increases as the distance of the point from the equator increases. Nevertheless, Mercator charts are widely used for navigational purposes since the projection is orthomorphic and rhumb lines appear as straight lines.

Broadly, navigational training or instruction apparatus according to the invention is distinguished in that it includes electrical means for modifying the operation of means causing relative movement of the course-indicating element and the chart in accordance with the secant of the latitude of the craft concerned, whereby the movement of the indicating element with respect to a Mercator chart correctly represents the course of the craft whatever its latitude.

According to one aspect of the invention, navigational training or instruction apparatus for indicating the course of a craft on a Mercator chart, includes a course-indicating element, translating means responsive to electric signals to cause relative movement of the course-indicating element and the chart, and means co-operating with the translating means and operated in accordance with electric signals representing the movement of the craft in a north-south direction whereby the operation of the translating means, as a consequence of the application to the apparatus of signals representing the movement of the craft, is caused to vary as a function of the latitude of the craft, whereby the course of the craft is indicated substantially correctly on the Mercator chart.

According to another aspect of the invention a navigational training or instruction apparatus for indicating the course of a craft with respect to a Mercator chart, includes a latitude computer which is responsive to electric signals representative of the movement of the craft in a north-south direction, variable electrical means controlled by the latitude computer, an indicating element, and translating means controlled jointly by electric signals representative of the movement of the craft and by the variable electrical means to cause relative movement of the indicating element and the chart as a function of the movement of the craft and of the secant of the latitude of the craft.

One particular object of the invention is to provide a novel apparatus for use with navigational training or instruction apparatus of the kind comprising a course-indicating element and translating means for causing relative movement of the said element and a chart in response to electric signals, including a latitude computer responsive to electric signals representative of the movement of the craft in a north-south direction and electrical means controlled by the latitude computer and adapted to be connected to the translating means, whereby the operation of the latter as a consequence of the application to the apparatus of signals representing the movement of the craft, is caused to vary with the secant of the latitude and the course of the craft is indicated substantially correctly on the Mercator chart.

Figure 2:
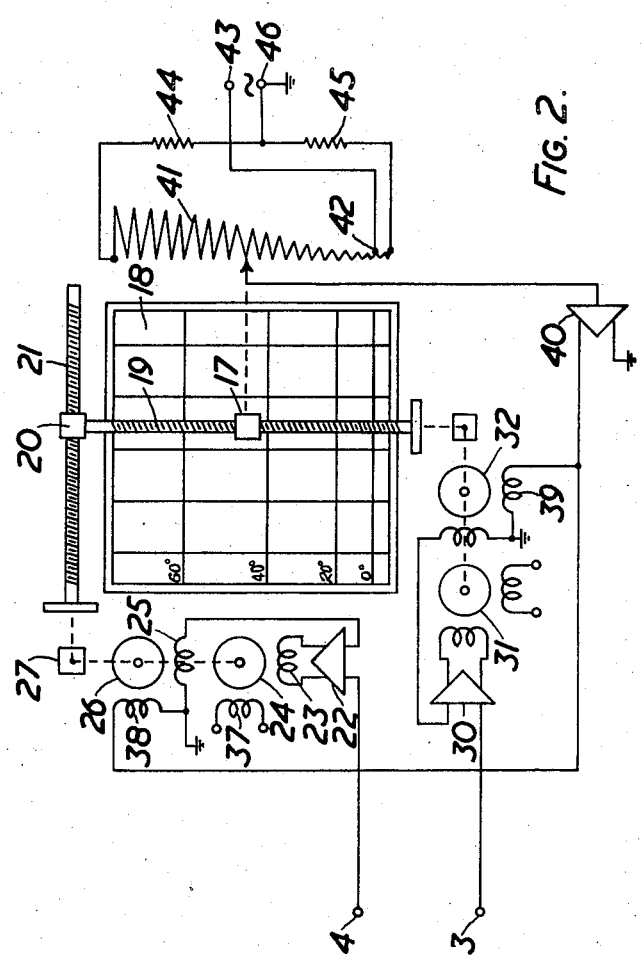

To facilitate a proper understanding of the invention, it will now be described, by way of example only, with reference to the accompanying drawings wherein:

Fig. 1 shows, in diagrammatic manner, one embodiment of apparatus according to the invention for use in conjunction with a flight-simulating equipment, and Fig. 2 shows, in similar manner, an alternative embodiment of apparatus according to the invention for this same purpose.

Referring to Fig. 1, voltages representing the computed north-south (northerly or southerly) ground speed and the east-west (easterly or westerly) ground speed of a simulation craft which is being controlled by a pupil, are applied to terminals 3 and 4 respectively. Terminal 3 is connected to the input circuit of an amplifier 5 the output of which energises a winding 6 of a two-phase reversible motor 7 which drives a two-phase generator 8. A winding 9 of the latter is connected back to the amplifier 5, and windings 10 and 11 of the motor 7 and the generator 8 are connected to sources of alternating voltage of steady peak amplitudes and phases (quadrature phase in the case of the motor winding 10). When the motor 7 rotates, a rate feed-back signal is applied to the amplifier 5 from the winding 9 of the generator and ensures that the motor speed is proportional to the voltage input from terminal 3. The amount of rotation of the motor 7 is therefore proportional to the time integral of the input voltage (north-south ground speed), that is to say, to the change of latitude of the aircraft.

The motor 7 also drives, through a gear-box 12, the wipers of the two drum-type contoured potentiometers 13 and 14. These wipers are manually preset to a position corresponding to the initial latitude of the aircraft by means of an adjusting knob 15, and are thereafter automatically adjusted in response to change in simulated latitude of the aircraft by means of the motor 7.

A fixed resistor 16 is connected between a centre-tapping on the potentiometer 13 and ground, and the east-west ground speed signal at terminal 4 is applied across the two halves of potentiometer 13 in parallel, and resistor 16 in series with them. Resistor 16, the resistance of potentiometer 13 and the contour of this potentiometer are so chosen that the voltage signal derived from the latter is proportional to the secant of the angle represented by the angular displacement of the wiper from the centre-tapping, which corresponds to zero latitude. Thus the signal appearing at the wiper of potentiometer 13 is proportional to the product of the east-west ground speed of the aircraft and the scale factor, i. e. the secant of the latitude. Furthermore the scale factor will change with change of latitude of the aircraft.

The corrected speed signals from the wiper of potentiometer are used to bring about movement of a recording pen 17 in an east-west direction over the surface of a Mercator chart 18, in a manner which will now be described. The pen 17 is mounted on a vertical lead-screw 19 in such a manner that the rotation of the latter causes a linear movement of the pen along the lead-screw. Similarly, a bearing block 20, to which the vertical lead-screw is affixed, is mounted on a horizontal lead-screw 21 in such a manner that rotation of the latter causes a linear movement of the block 20 along the horizontal lead-screw and a movement of the vertical lead-screw and the pen across the chart.

The signals from the wiper of potentiometer 13 are applied to an amplifier 22 of an integrating servo unit. This amplifier 22 energises a winding 23 of a motor 24 and a winding 25 of a generator 26 provides a rate feedback signal. Through a gear-box 27, the motor 24 drives the horizontal lead-screw 21 and the speed of linear movement of the block 20 along this lead-screw at any moment is therefore proportional to the product of the east-west ground speed of the aircraft and secant of its latitude.

To obtain the rotation of the vertical lead-screw 19, the potentiometer 14 could be given a similar contour to that of potentiometer 13 and could be connected in a similar circuit. It would receive north-south ground speed signals from terminal 3 and its output signals would be used to energise an integrating unit for driving the vertical lead-screw. To avoid the addition of the errors of the two integrating units responsive to north-south speed signals, it is preferable to use the arrangement shown in Figure 1, in which the unit for driving the vertical lead-screw is a positioning servo slaved to the latitude servo.

It is arranged that the output signal from the potentiometer 14 represents the desired position of the pen along the vertical lead-screw.

The potentiometer 14 is centre-tapped to ground (this point representing the equator) and has equal and anti-phase signals (which will be called, for convenience, $+e$ and $-e$) applied to its upper and lower ends respectively from terminals 28 and 29. As the wiper of this potentiometer is driven by the motor 7, the signal appearing at this wiper will represent a function of the latitude, the particular function depending on the contour of the potentiometer 14. As the scale at any point on a Mercator chart is proportional to the secant of the latitude, the vertical distance $y$ between any two latitudes $\theta_1$ and $\theta_2$ is given by $$y = R \int_{\theta_2}^{\theta_1} \sec \theta . d\theta$$

$$= R \log \tan \left(\frac{\theta_1}{2}+\frac{\pi}{4}\right)$$

when $\theta_2$ represents the equator.

The potentiometer 14 must therefore provide an output potential which for any latitude $\theta$ is proportional to $$R \log \tan \left(\frac{\theta}{2}+\frac{\pi}{4}\right)$$

Its contour can be deduced from this by conventional methods.

The wiper of this potentiometer is connected to an amplifier 30 of a positioning servo unit, the motor 31 of which drives the vertical lead-screw 19. The connections of the windings of the motor 31 and the generator 32 of this unit are the same as those for the motor 24 and the generator 26 associated with the horizontal lead-screw. The positioning servo is different however in that it includes a linear drum-type potentiometer 33, the wiper of which is driven by the motor 31 through the gear-box 34 and is connected back to the amplifier input circuit. The centre tapping of this potentiometer is grounded, and its ends are connected to terminals 35 and 36 to which equal and antiphase alternating voltages $-e$ and $+e$ are respectively applied.

This servo unit operates as follows:

The output of the potentiometer 14, which represents the desired position of the pen 17 along the lead-screw 19, and the output of the potentiometer 33, which represents the actual position of the pen along this lead-screw, are applied through amplifier 30 to the motor 31. If these two signals are not equal and in phase opposition, there will be a resultant which will cause the motor 31 to rotate, the direction of the rotation being such as to drive the wiper of potentiometer 33 so as to reduce the resultant. The motor will rotate until the resultant has been eliminated and will thus position this wiper (and therefore the pen 17 along the vertical lead-screw) in accordance with the value of the input signal.

The speed of the linear movement of the pen along the vertical lead-screw at any moment is therefore proportional to the product of the north-south ground speed of the aircraft and the scale factor, again, the secant of the latitude.

Thus the speed of movement of the pen is always corrected in accordance with the scale factor at the point on the chart over which the pen is passing, and the course of the simulated craft is correctly recorded on the chart whatever its latitude.

Figure 2 shows an alternative embodiment of the invention for recording the course of a craft on a Mercator chart, given electric signals representative of the ground speed of the craft.

In this embodiment, the units for driving the lead-screws are the same as in Figure 1 and are given the same reference numerals. The variation of the speed of the recording pen with the latitude of the craft is achieved by varying the voltage applied to the excitation windings of the rate-signal generators as a selected function of the scale at the appropriate point on the Mercator chart.

Apparatus of this kind, in which the speed of the motor is varied as a function of a voltage applied to the excitation winding of the rate-signal generator, driven by the motor, is described and claimed in my co-pending application, Serial No. 444,693 filed July 21, 1954.

In Figure 2, the terminals 3 and 4, to which the north-south and east-west ground signals respectively are applied, are connected directly to the amplifiers 30 and 22 which energise the motors 31 and 24 and cause rotation of the lead-screws. As in Figure 1, a rate signal derived from the winding 25 of the generator 26 is fed back to the amplifier 22, and a corresponding rate signal is fed back to the amplifier 30 from the generator 32. Also, as in Figure 1, the output of the amplifier 22 serves to energise the winding 23 of the motor 24, the quadrature winding 37 of the motor being connected to a source of alternating voltage of steady peak amplitude. The windings of the motor 31 are similarly connected.

Excitation windings 38 and 39 of the generators 26 and 32 are connected in parallel to the output circuit of an amplifier 40, which obtains its input signal from a potentiometer 41. This potentiometer is contoured in accordance with the variation of latitude on the chart. The equation representing this contour will be calculated below.

A point 42 on the potentiometer, corresponding to the equator on the chart, is connected to a terminal 43 and the ends of the potentiometer are connected through resistors 44 and 45 to a second terminal 46. An alternating potential of suitable amplitude is applied between terminals 43 and 46, and terminal 46 is connected to earth.

In the example shown, the resistor 45 will have a greater value than the resistor 44, owing to the fact that there is only a small portion of the chart below the equator, and therefore only a small length of the potentiometer 41 between point 42 and its lower end.

In my said co-pending application it is shown that in a motor-generator unit of the type which has been described, over a wide range of speeds, the speed of the motor varies inversely as the amplitude of the signal applied across the excitation winding of the generator (e. g. the winding 39 of the generator 32). By giving to the potentiometer 41 a suitable contour, it can be arranged that its output signal varies as the cosine of the latitude of the aircraft. This signal, after suitable amplification by amplifier 40, is applied across the windings 38 and 39 of the generators 26 and 32. The speeds of the motors 24 and 31 in addition to their dependence on the east-west and north-south ground speed signals, will therefore also vary as the reciprocal of the cosine of the latitude, i. e. as the secant of the latitude, as is required for a Mercator chart.

The form necessary for the potentiometer 41 can be found as follows:

It is known that a distance measured in a north-south direction on a Mercator chart between latitudes $\theta_1$ and $\theta_2$ is given by the expression $$R \int_{\theta_2}^{\theta_1} \sec \theta . d\theta$$

where R is a constant for any given chart.

If $y$ represents the north-south distance on the chart from the equator to latitude $\theta$, integration of the above expression gives:

$$y = R \log \tan \left(\frac{\theta}{2} + \frac{\pi}{4}\right)$$

From this, $$e^{y/R} = \tan \left(\frac{\theta}{2} + \frac{\pi}{4}\right)$$

Therefore $$\tan^{-1} e^{y/R} = \frac{\theta}{2} + \frac{\pi}{4}$$

and $$\theta = 2 \left(\tan^{-1} e^{y/R} - \frac{\pi}{4}\right)$$

Therefore $$\cos \theta = \cos 2 \left(\tan^{-1} e^{y/R} - \frac{\pi}{4}\right)$$

This equation gives the value of the cosine of the latitude, and therefore the required output voltage from the potentiometer, in terms of the vertical distance $y$ of a given point from the equator on the chart. The contour of the potentiometer can be deduced from the expression on the right hand side using conventional techniques.

The apparatus of Figure 2 would be unsuitable for use with skew Mercator charts. The apparatus of Figure 1 would still be suitable, however, with the insertion of known apparatus for resolving the north-south and east-west velocities along the vertical and horizontal axes of the chart.

What I claim is:

1. Navigational training apparatus for indicating the course of a craft with respect to a Mercator chart, comprising means to support said chart, a course indicating element movable over said chart, driving means to cause relative movement of said element and said chart in two directions, electrical control means for said driving means responsive to separately received electrical signals representing east-west and north-south displacement respectively to cause relative movements of said element and said chart as functions of said separate signals respectively, computer means responsive to received electrical signals representing north-south ground speed of the craft to provide a computed output dependent on the latitude of the craft, and circuit control means operated by said computer means and coacting with the latter to modify separately received electrical signals representative of east-west and north-south ground speeds of the craft according to the latitude of such craft, said circuit control means being operable to transmit such modified electrical signals separately to said electrical control means to cause the said functions of the relative movements of the indicator element and the chart to be in accordance with the latitude of the craft.

2. Navigational training apparatus for indicating the course of a craft with respect to a Mercator chart, comprising means to support said chart, a course indicating element movable over said chart, first and second electrical driving means to cause relative movement of said element and said chart in mutually perpendicular directions, first electrical control means to cause actuation of said first driving means as a function of input signals representing east-west displacement, second electrical control means to cause actuation of said second driving means as a function of input signals representing north-south displacement, computer means responding to the said signals representing north-south displacement to provide a computed output dependent on the latitude of the craft, and variable circuit control means controlled by said computer means and operative under such control to modify each of said east-west and north-south input signals according to the latitude of such craft and by separate modified east-west signals to cause said first control means to actuate said first driving means according to the latitude of the craft and by separate modified north-south signals to cause said second control means to actuate said second driving means according to the latitude of the craft.

3. Navigational training apparatus for indicating the course of a craft with respect to a Mercator chart, comprising means to support said chart, a course indicating element movable in two directions over said chart, a first circuit to receive electrical signals representing east-west displacement of the craft, a second circuit to receive electrical signals representing north-south displacement of the craft, computer means in said second circuit to give a computed output dependent on the secant of the latitude of the craft, circuit controlling means in said first and second circuits operable by said computer means, first and second driving means respectively for actuating said indicating element in said corresponding two directions, and means including said first and second driving means to actuate the indicating element under the conjoint control of the signals received by the first and second circuits and of said circuit controlling means to indicate the course of the craft correctly on the Mercator chart.

4. Navigational training apparatus according to claim 3 wherein said circuit controlling means comprises a potentiometer selected to provide an output signal determined by said computed output and the signals received by said first circuit.

5. Navigational training apparatus according to claim 3 wherein said circuit controlling means comprise a potentiometer producing a variable signal for determining the movement of the driving means representing north-south movement of the indicating element.

6. Navigational training apparatus according to claim 3 wherein said circuit controlling means comprise a potentiometer operable in unison with the north-south movement of the indicating element.

7. Navigational training apparatus according to claim 3 wherein each said driving means comprises a motor responsive to control signals derived from said first or second circuits respectively, a generator driven by the motor, excited means for said generator dependent on the operation of said computer means, and a rate feed back circuit from said generator to said motor to modify operation of said motor under the response of said control signals.

8. Navigation training apparatus for indicating the course of a craft with respect to a Mercator chart, comprising means to support said chart, a course indicating element movable over said chart, driving means to cause relative movement of said element and said chart in two directions, electrical control means for said driving means responsive to separately received electrical signals representing east-west and north-south ground speeds of the craft to cause relative movements of said element and chart as functions of said separate signals respectively, means responsive to received electrical signals representing north-south ground speed of the craft to modify each of separately received electrical signals representative of the east-west and north-south ground speeds of the craft according to the latitude of such craft and to cause said electrical control means to actuate said driving means in accordance with such separate modified electrical signals and thereby to cause the said functions of the relative movements of the indicator element and the chart to be in accordance with the latitude of the craft.

References Cited in the file of this patent

UNITED STATES PATENTS

| | | |
|---|---|---|
| 2,393,474 | Jones | Jan. 22, 1946 |
| 2,443,604 | Dehmel | June 22, 1948 |
| 2,569,328 | Omberg | Sept. 25, 1951 |
| 2,687,580 | Dehmel | Aug. 31, 1954 |

FOREIGN PATENTS

| | | |
|---|---|---|
| 601,893 | Great Britain | May 13, 1948 |
| 1,066,312 | France | June 3, 1954 |